United States Patent
Kitai et al.

(10) Patent No.: US 8,459,395 B2
(45) Date of Patent: Jun. 11, 2013

(54) SWITCHING DEVICE OF A DRIVING POWER TRANSMISSION SYSTEM AND AN OFF-ROAD VEHICLE

(75) Inventors: Haruo Kitai, Akashi (JP); Hiroyuki Fujimoto, Fukurol (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 1239 days.

(21) Appl. No.: 11/788,548

(22) Filed: Apr. 20, 2007

(65) Prior Publication Data

US 2008/0035406 A1 Feb. 14, 2008

(30) Foreign Application Priority Data

Apr. 20, 2006 (JP) ................................. 2006-116949

(51) Int. Cl.
*B60K 23/08* (2006.01)
(52) U.S. Cl.
USPC .......................................... 180/247; 180/233
(58) Field of Classification Search
USPC ................................................ 180/233, 247
See application file for complete search history.

(56) References Cited

U.S. PATENT DOCUMENTS

| 4,407,387 | A | * | 10/1983 | Lindbert ........................ 180/247 |
| 4,729,450 | A | * | 3/1988 | Morisawa et al. ............ 180/249 |
| 4,773,500 | A | * | 9/1988 | Naito et al. .................... 180/233 |
| 4,883,138 | A | * | 11/1989 | Kameda et al. ............... 180/249 |
| 5,005,663 | A | * | 4/1991 | Niide et al. .................... 180/247 |
| 5,799,749 | A | * | 9/1998 | Yamamoto et al. ........... 180/247 |
| 6,039,138 | A | * | 3/2000 | Sugimoto et al. ............. 180/245 |
| 6,076,624 | A | * | 6/2000 | Izumi et al. .................... 180/291 |
| 6,082,514 | A | * | 7/2000 | Averill ........................ 192/69.42 |

FOREIGN PATENT DOCUMENTS

| JP | 11-151947 | 6/1999 |
| JP | 2004-187378 | 7/2004 |

* cited by examiner

*Primary Examiner* — Tony H. Winner
*Assistant Examiner* — Jacob Knutson
(74) *Attorney, Agent, or Firm* — Alleman Hall McCoy Russell & Tuttle LLP

(57) ABSTRACT

A switching device of a driving power transmission system equipped in an off-road vehicle, including a switching lever configured to switch driving power transmission of the driving power transmission system, and a negative-pressure actuator module that is coupled to the switching lever and is configured to operate the switching lever.

4 Claims, 5 Drawing Sheets

SWITCHING DEVICE OF A DRIVING POWER TRANSMISSION SYSTEM AND AN OFF-ROAD VEHICLE

TECHNICAL FIELD

The present invention relates to an off-road vehicle and, particularly to a switching device that is mounted in a driving power transmission system of the off-road vehicle and is configured to switch driving power transmission of the driving power transmission system.

BACKGROUND OF THE INVENTION

Some off-road vehicles such as all terrain vehicles (ATVs), utility vehicles, or service vehicles are capable of switching between two-wheel-drive and four-wheel-drive. A system for enabling the switching between the two-wheel-drive and the four-wheel-drive is disclosed in Japanese Laid-Open Patent Application Publication No. 2004-187378 and Japanese Patent No. 2955260. The system is positioned in a drive path position between a propeller shaft configured to transmit a driving power of an engine to each drive wheel and a gear assembly configured to change a speed and/or a direction of rotation of the propeller shaft and to transmit the rotation to the corresponding drive wheel. The system is configured to disconnect the drive path to stop driving of the corresponding drive wheel.

In some cases, the connection/disconnection of the drive path may be operated by a lever unit protruding to the outside from a casing covering the system. The lever unit may be actuated by an electric device or a hydraulic device.

When the lever unit is actuated by the electric device or the hydraulic device, high-precision sensors and other mechanisms for accurate control are needed, thus increasing cost.

SUMMARY OF THE INVENTION

The present invention addresses the above described conditions, and an object of the present invention is to provide a switching device of a driving power transmission system that is capable of switching driving power transmission with a simple construction, and an off-road vehicle including the switching device.

According to a first aspect of the present invention, there is provided a switching device of a driving power transmission system equipped in an off-road vehicle, comprising a switching lever configured to switch driving power transmission of the driving power transmission system; and a negative-pressure actuator module that is coupled to the switching lever and is configured to operate the switching lever.

In such a configuration, switching of driving power transmission of the driving power transmission system is accomplished with a simple construction. As used herein, the switching of driving power transmission of the driving power transmission system includes connection and disconnection of a driving power, speed change thereof, direction change thereof, etc.

The negative-pressure actuator module may be coupled to an air-intake system of an engine unit mounted in the off-road vehicle and may be configured to operate by a negative pressure generated in the air-intake system of the engine unit. In such a configuration, since the negative pressure generated in the air-intake system of the engine unit can be utilized, there is no need for a device for exclusive use.

The negative-pressure actuator module may be disposed in non-contact with the engine unit. In such a configuration, since the negative-pressure actuator module is less susceptible to heat generated in the engine unit, thermal damage of the negative-pressure actuator module can be suppressed.

The switching device may further comprise an electromagnetic valve via which the negative-pressure actuator module is coupled to the air-intake system of the engine unit, the electromagnetic valve being configured to be turned on and off so as to or not to permit the negative pressure to be applied to the negative-pressure actuator module. In such a configuration, the negative-pressure actuator module can be operated by the negative pressure in the air-intake system of the engine unit that increases according to the engine speed.

The switching device may further comprise a bias member that is mounted to the switching lever and is configured to apply a force to cause the switching lever to be in a first switch position. In such a configuration, the switching lever can be positioned in the first switch position when the negative-pressure actuator module is not operating.

The switching lever may be configured to switch between a two-wheel-drive position and a four-wheel-drive position, and the first switch position may be the two-wheel-drive position. In such a configuration, the switching lever can be positioned in the two-wheel-drive position when the negative-pressure actuator module is not operating.

According to another aspect of the present invention, there is provided an off-road vehicle comprising a switching device of a driving power transmission system, the switching device including a switching lever configured to switch driving power transmission of the driving power transmission system; and a negative-pressure actuator module that is coupled to the switching lever and is configured to operate the switching lever.

In such a configuration, switching of driving power transmission of the driving power transmission system for the off-road vehicle is accomplished with a simple construction. As used herein, the switching of driving power transmission of the driving power transmission system includes connection and disconnection of the driving power, speed change thereof, direction change thereof, etc.

The above and further objects and features of the invention will more fully be apparent from the following detailed description with accompanying drawings.

DETAILED DESCRIPTION OF THE INVENTION

Hereinafter, an embodiment of an off-road vehicle according to the present invention will be described with reference to the drawings. In this embodiment described below, the directions are referenced from the perspective of a rider (not shown) riding in the off-road vehicle of FIG. 1 except for cases specified.

Figure 1:
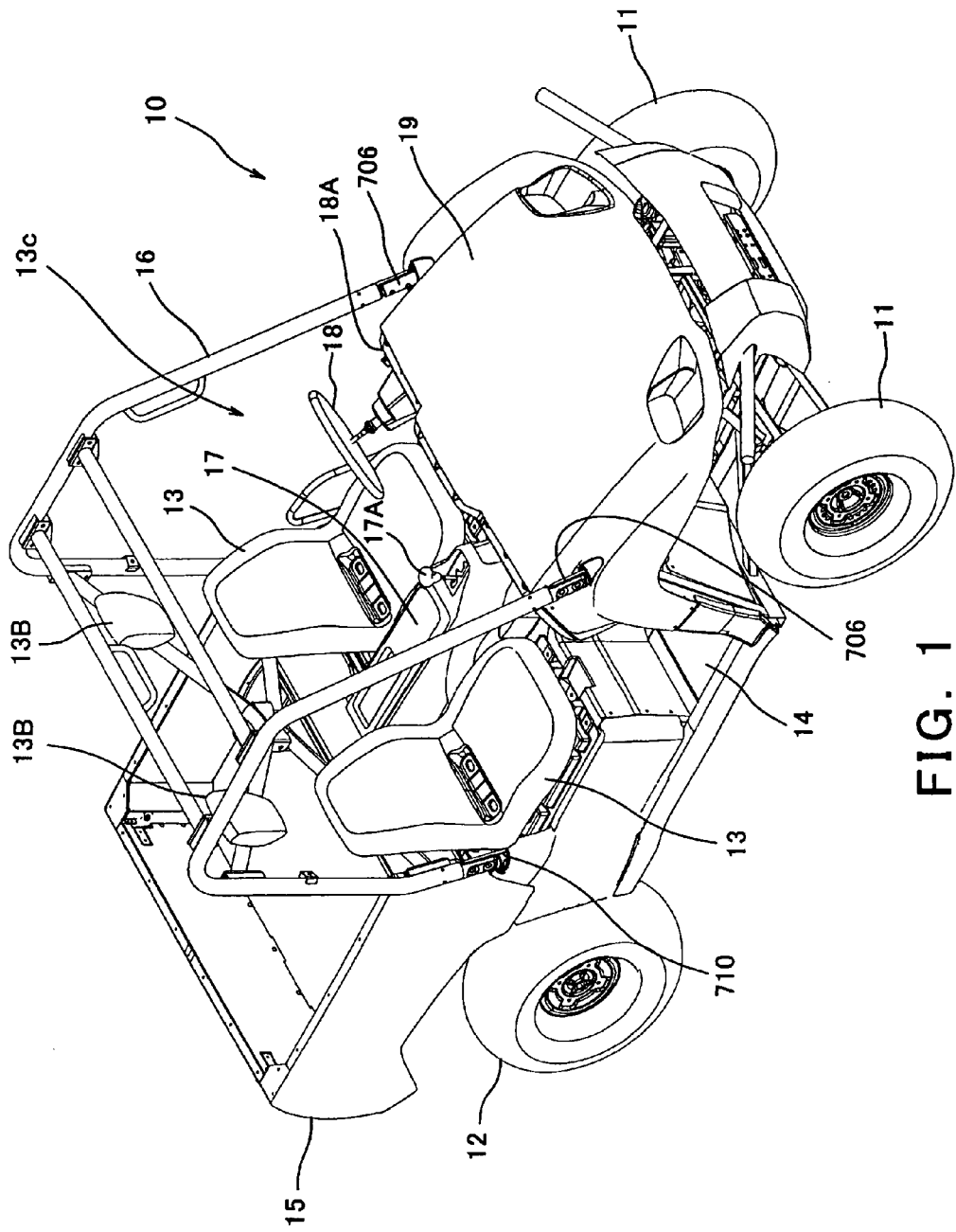
FIG. 1 is a perspective view of an off-road vehicle according to an embodiment of the present invention, as viewed from rightward and forward.

FIG. 1 is a perspective view of an off-road vehicle including a switching device of a driving power transmission system according to an embodiment of the present invention, as viewed from rightward and forward. Turning now to FIG. 1, an off-road vehicle 10 is called a utility vehicle or a service vehicle, which are merely exemplary. Whereas in this embodiment, a switching device configured to perform switching between two-wheel-drive and four-wheel-drive for a four-wheel vehicle is illustrated, the present invention is applicable to a switching device of a driving power transmission system for vehicles equipped with three wheels or more.

The off-road vehicle 10 includes a passenger riding cabin 13c formed between front wheels 11 and rear wheels 12. Two seats 13 are arranged in the cabin 13c in a lateral direction of a vehicle body of the off-road vehicle 10. A console box 17 provided with an article container is equipped between the two seats 13. A shift lever 17A protrudes upward from a front portion of the console box 17. A flat floor 14 on which a passenger's feet rest is provided in front of the seats 13. An accelerator pedal and a brake pedal (not shown) are provided in front of the seat 13 on a driver's side. An instrument panel 18A is disposed above these pedals.

A hood 19 is disposed in front of the instrument panel 18A to cover the two front wheels 11 from above. A cabin frame member 16 defining the cabin 13c extends from right and left ends of a rear portion of the hood 19. The cabin frame member 16 extends from a rear portion of the hood 19, through a region above the seats 13, and to a region behind the seats 13. Head rests 13B of the seats 13 are attached to the cabin frame member 16 above back portions of the seat 13. The off-road vehicle 10 is not equipped with panels and others at a front portion, a rear portion, and side portions of the cabin frame member 16 and is thus opened to the outside.

A load-carrying platform 15 is provided behind the cabin frame member 16 so as to cover the two rear wheels 12 from above.

Figure 2:
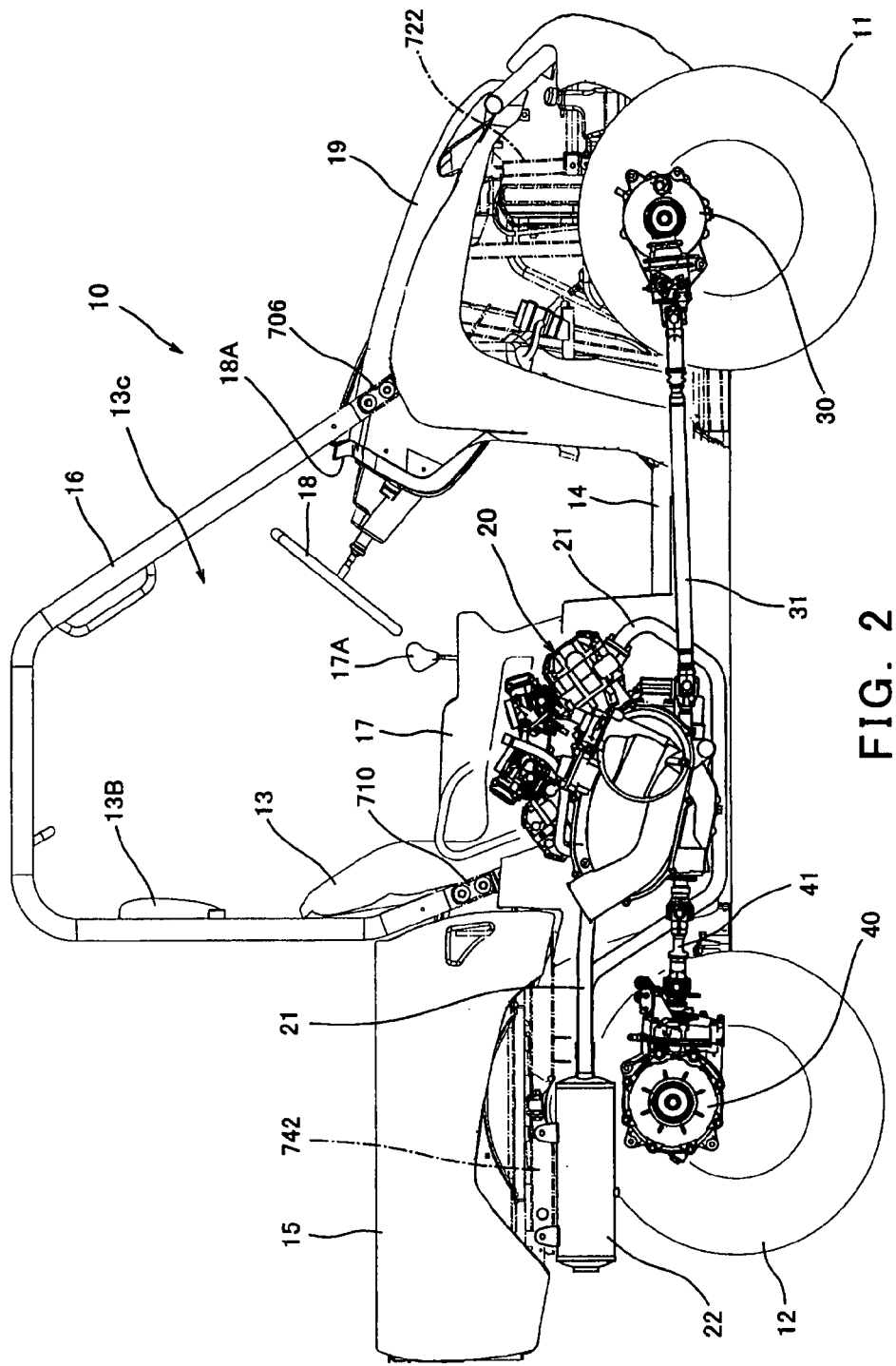
FIG. 2 is a right side view showing in perspective a driving power transmission system of the off-road vehicle of FIG. 1.

FIG. 2 is a right side view of the off-road vehicle 10 of FIG. 1, showing in perspective a drive system, which is an example of the driving power transmission system equipped in the off-road vehicle 10. An engine unit 20 of the off-road vehicle 10 is center-mounted between the right and left seats 13 (see FIG. 3) and below the seats 13, to be precise, right below the console box 17.

In this embodiment, the engine unit 20 is a V-type two-cylinder engine including cylinders arranged in a longitudinal direction of the vehicle body. A first exhaust pipe 21 extends from a front surface of the engine unit 20, through a region under the engine unit 20, and to a region behind the engine unit 20. A second exhaust pipe 21 extends rearward. These two exhaust pipes 21 are coupled to a muffler 22 disposed under the load-carrying platform 15.

Figure 3:
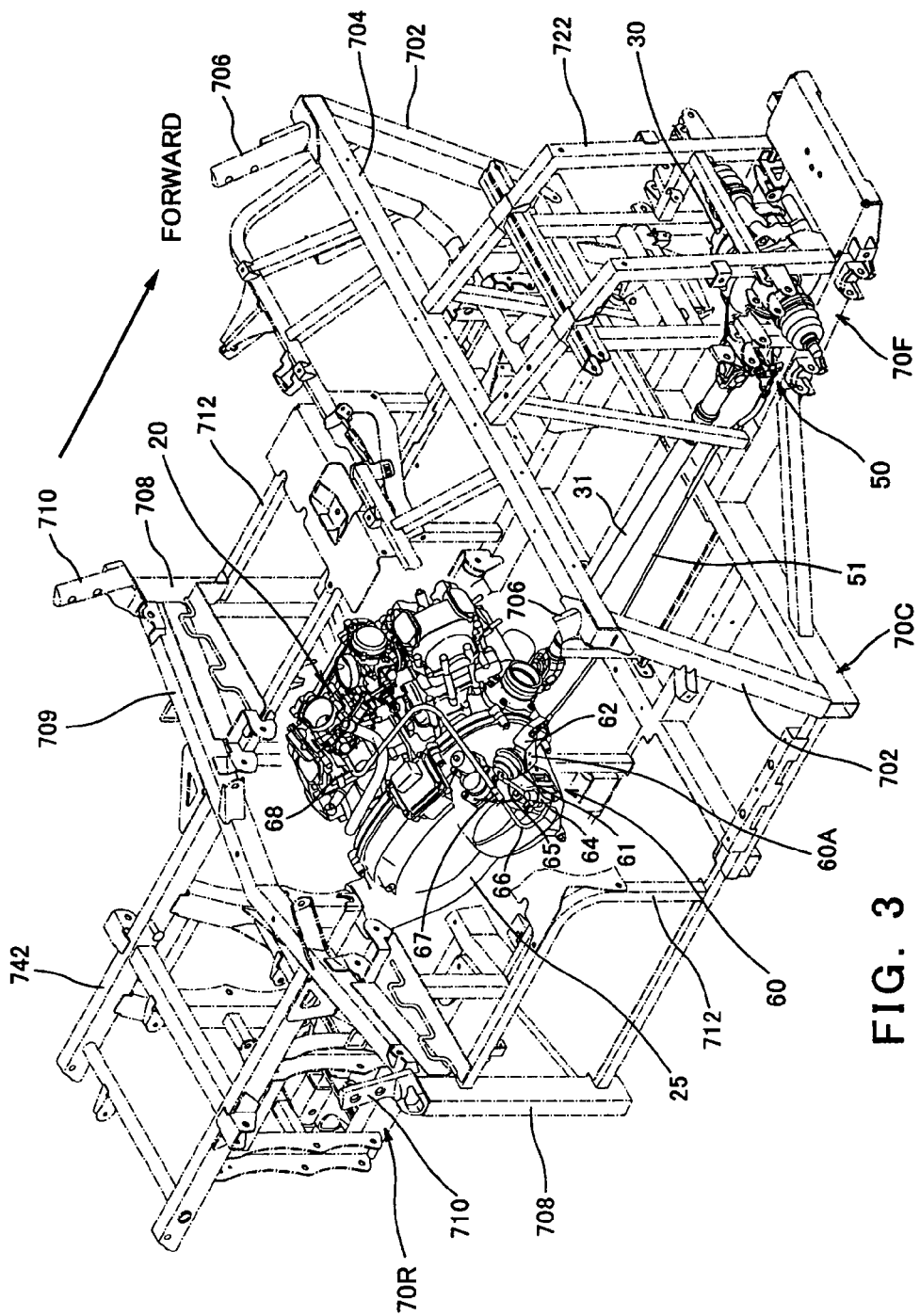
FIG. 3 is a perspective view showing arrangement and configuration of the driving power transmission system of FIG. 2, together with a frame structure of the off-road vehicle, as viewed from rightward and forward.

The engine unit 20 is integrally equipped with a transmission 25 including a belt-drive gearless transmission (see FIG. 3). One end of a front propeller shaft 31 is coupled to a front output end of the transmission 25. The front propeller shaft 31 extends forward through a region under the floor 14, and an opposite end thereof is coupled to the front wheels 11 via a front gear assembly 30. One end of a rear propeller shaft 41 is coupled to a rear output end of the transmission 25, and an opposite end thereof is coupled to the rear wheels 12 through a rear gear assembly 40.

FIG. 3 is a perspective view showing arrangement and configuration of the driving system of FIG. 2, together with a frame structure of the off-road vehicle 10 indicated by a one-dotted line, as viewed from rightward and forward. As shown in FIG. 3, in this embodiment, the frame structure of the off-road vehicle 10 includes a center frame group 70C forming a lower half part of the cabin 13c, a front frame group 70F located forward of the center frame group 70C, and a rear frame group 70R located behind the center frame group 70C.

A front half part of the center frame group 70C extends in the lateral direction over the vehicle body to constitute a bottom portion forming a floor 14 (see FIGS. 1 and 2), and a rear half part thereof has seat support frame members 712 spaced apart from each other in the lateral direction. Seat portions of the seats 13 (FIG. 2) are fixed to upper surfaces of the seat support frame members 712. The engine unit 20 is positioned between the two seat support frame members 712.

A front end portion of the center frame group 70C includes front masts 702 extending upward from right and left ends thereof, a front cross member 704 extending between upper ends of the two front masts 702, and mounting brackets 706 extending upward from right and left end portions of the front cross member 704.

A rear end portion of the center frame group 70C includes rear masts 708 extending upward from right and left ends thereof, a rear cross member 709 extending between upper ends of the two rear masts 708, and mounting brackets 710 extending upward from upper ends of the rear masts 708.

The cabin frame member 16 (see FIGS. 1 and 2) is mounted to the front mounting brackets 706 and the rear mounting brackets 710.

The front frame group 70F is coupled to a front end portion of the center frame group 70C. The front frame group 70F has a bottom portion for retaining the front gear assembly 30 and includes hood support frame members 722 for covering the front gear assembly 30. The hood 19 (FIGS. 1 and 2) is fastened to upper surfaces of the hood support frame members 722.

The rear frame group 70R is coupled to a rear end portion of the center frame group 70C. The rear frame group 70R has a bottom portion for retaining the rear gear assembly 31 (not shown in FIG. 3, see FIG. 2), and includes load-carrying platform support frame members 742 for covering the rear gear assembly 31. The load-carrying platform 15 (see FIGS. 1 and 2) is fastened onto upper surfaces of the load-carrying platform support frame members 742.

Figure 4:
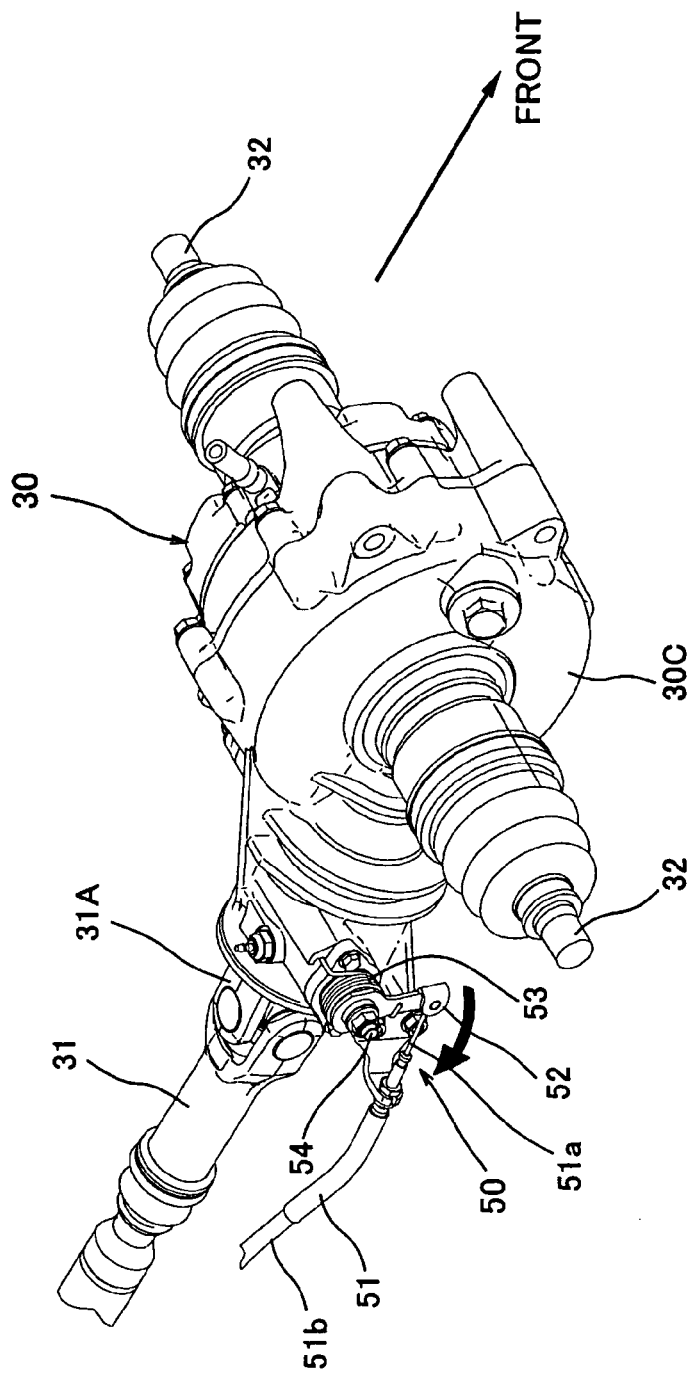
FIG. 4 is a perspective view showing a construction of a front portion (driving power switching unit) of a switching device of the driving power transmission system of FIG. 3, as viewed from rightward and forward.

As shown in FIGS. 3 and 4, the front gear assembly 30 is coupled to the propeller shaft 31 via a universal joint 31A. The front gear assembly 30 contains a differential gear unit (not shown) inside a gear case 30C. Drive shafts 32 which are output ends of the differential gear unit extend in the lateral direction and are coupled to the front wheels 11 (see FIGS. 1 and 2) via constant-velocity joints and the like.

The rear gear assembly 31 will not be described in detail.

The front gear assembly 30 contains a clutch mechanism (not shown) using a known technique at a location near the universal joint 31A. A driving power switching unit 50 protrudes rearward from the gear case 30C. By operating the clutch mechanism, the driving power switching unit 50 is configured to connect and disconnect the front gear assembly 30 and the front propeller shaft 31 so as to and not to permit driving power transmission between them and to thus switch driving power transmission between two-wheel-drive and four-wheel-drive.

The driving power switching unit 50 includes a switching lever 52 fastened to an operational shaft 54 of the clutch mechanism and a torsion spring 53 which may be used as a bias member for applying a force to cause the switching lever 52 to be in the two-wheel-drive position. In this construction, the driving power switching unit 50 is maintained in the two-wheel-drive position unless the switching lever 52 is operated externally. Whereas the torsion spring 53 is used as the bias member for applying a force to cause the switching lever 52 to be in the two-wheel-drive position, any other suitable springs may be used so long as they perform the same function. The bias member for applying the force may be an elastic body made of a rubber material or a polymer material. As shown in FIG. 3, the switching lever 52 is coupled through a cable 51 to a switching drive unit 60 for driving the driving power switching unit 50 so that the driving power switching unit 50 (switching lever 52) and the switching drive unit 60 can operate in association with each other.

Figure 5:
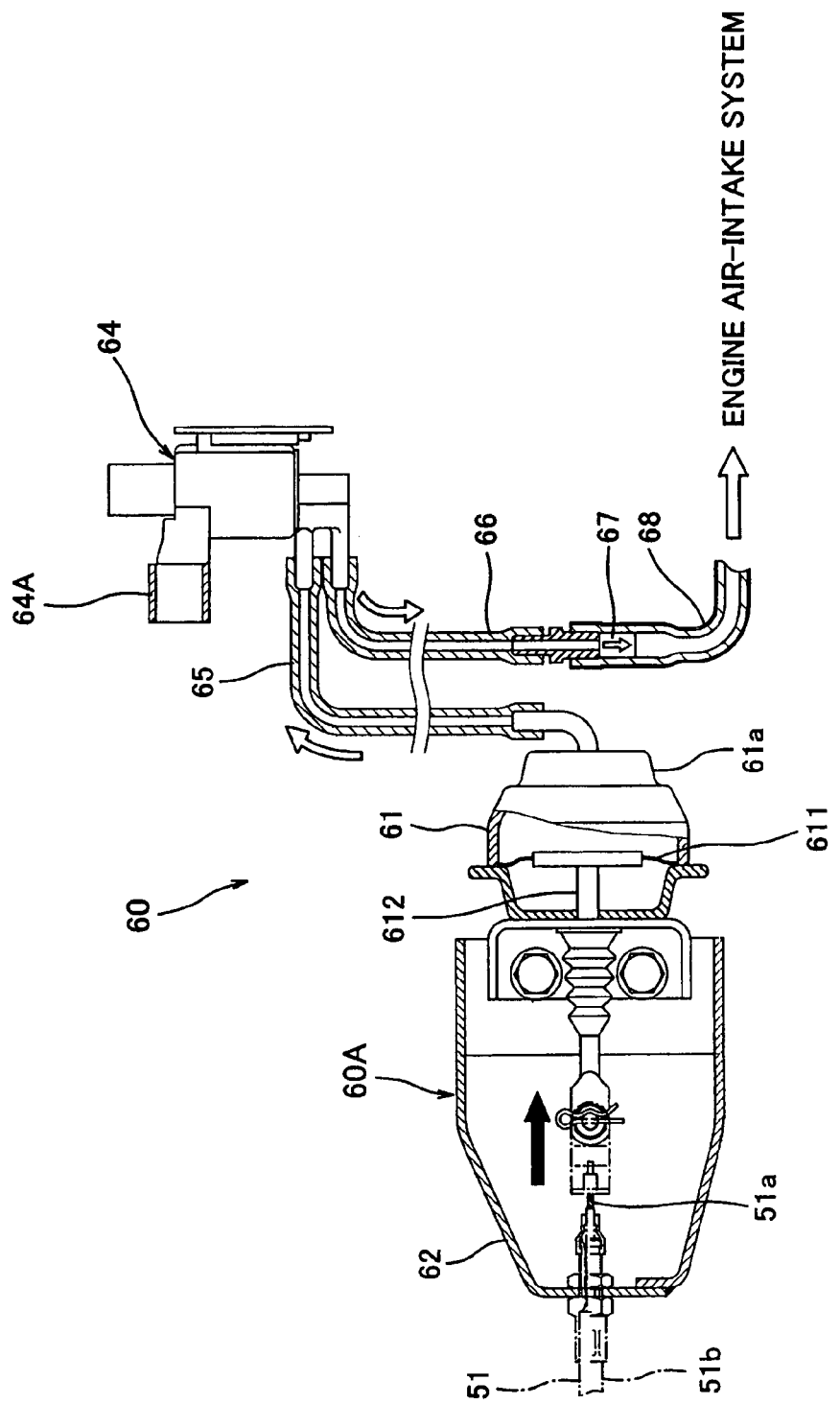
FIG. 5 is a partial cross-sectional view showing a construction of a rear portion (switching driving unit) of the switching device of the driving power transmission system of FIG. 3.

As shown in FIG. 5, the switching drive unit 60 includes a negative-pressure actuator module 60A and an electromagnetic solenoid valve 64.

The negative-pressure actuator module 60A includes a diaphragm-operative pneumatic actuator 61 and a bracket 62. In this embodiment, the actuator 61 has a structure in which an internal coil spring is removed from a general-purpose diaphragm-operative pneumatic actuator. Therefore, the actuator 61 is obtained by altering the general-purpose actuator. The actuator 61 includes a diaphragm 611 suspended in an inner space of a closed casing 61a. The diaphragm 611 is provided with an operational shaft 612 protruding to the outside of the casing 61a into an inner space of the bracket 62.

The bracket 62 is of a substantially-box shape. One surface of the bracket 62 is fastened to a surface of the casing 61a of the actuator 61 through which the operational shaft 612 of the actuator 61 protrudes and an opposite surface thereof retains an outer cable 51b of an opposite end of the cable 51 having a cable core 51a at one end thereof coupled to the switching lever 52 (see FIG. 4). The cable core 51a is slidably retained in the outer cable 51b, and the cable core 51a at the opposite end thereof is coupled to the operational shaft 612 extending through a space surrounded by the bracket 62.

The actuator 61 is coupled to a suction end of the electromagnetic solenoid valve 64 through a pipe 65 on the opposite side of a portion of the operational shaft 612 that protrudes. A pipe 66 is coupled to a discharge end of the electromagnetic solenoid valve 64 and is coupled to a pipe 68 via a check valve 67 that permits only discharge of air. The pipe 68 is coupled to an air-intake system of the engine unit 20. Preferably, the actuator 61 is positioned just before air-intake ports of the engine unit 20. In this manner, the actuator 61 is coupled to the air-intake system of the engine unit 20.

The electromagnetic solenoid valve 64 is coupled to a switch (not shown) or the like through a connector 64A and configured to be turned on and off by hand operation. In an on-state, the electromagnetic solenoid valve 64 releases an internal valve to permit a flow of air from the suction end to the discharge end, i.e., from the pipe 65 to the pipe 66 as indicated by a white arrow in FIG. 5.

The discharge end of the electromagnetic solenoid valve 64 is coupled to the air-intake system of the engine unit 20. Therefore, when an engine speed of the engine unit 20 increases and thereby a negative pressure generated in the air-intake system increases, a negative pressure is generated in an internal space of the actuator 61 that is located on the pipe 65 side, so that the diaphragm 611 is suctioned toward the electromagnetic solenoid valve 64. Thereby, the operational shaft 612 operates as indicated by a black arrow to pull the cable 51, causing the switching lever 52 to be pivoted against the force applied by the torsion spring 53. In this manner, the switching drive unit 60 switches from the two-wheel-drive position to the four-wheel-drive position.

As described above, since the switching device of this embodiment automatically switches from the two-wheel-drive position to the four-wheel-drive position in association with change in the engine speed of the engine unit 20 and is equipped with the check valve 67, it is able to reliably maintain a switched state, regardless of a negative pressure change due to air-intake pulsation of the air-intake system or slight decrease in the engine speed and by inhibiting a back flow of intake-air.

On the other hand, in an off-state, the electromagnetic solenoid valve 64 closes the internal valve, and instead the negative pressure for operating the actuator 61 is released to the atmosphere through an internal bypass passage of the electromagnetic solenoid valve 64. This makes the diaphragm 611 free.

The switching lever 52 loses a tension applied by the actuator 61 via the cable 51, and thus returns from the four-wheel-drive position to the two-wheel-drive position by the force applied by the torsion spring 53.

As described above, the torsion spring 53 disposed on the switching lever 52 side is configured to return the switching lever 52 from the four-wheel-drive position to the two-wheel-drive position. In this construction, since the torsion spring 53 with the switching lever 52 is exposed to the outside of the gear case 30C of the front gear assembly 30, maintenance or change thereof is easily carried out. In addition, it is not necessary to increase a size of the cable 51 to avoid bending or to dispose the cable 51 in a straight line shape.

Turning to FIG. 3 again, the switching drive unit 60 is positioned in the vicinity of and in non-contact with the engine unit 20. Since the switching drive unit 60 is positioned in the vicinity of the engine unit 20, the pipes 65, 66 and 67 can be shortened and responsiveness to the change in the engine speed of the engine unit 20 can be improved. Since the switching drive unit 60 is positioned in non-contact with the engine unit 20, the diaphragm 611 or the like of the actuator 61 which typically contains synthetic resin is not susceptible to thermal damage. As a result, an intricate structure for avoiding heat may be omitted.

A specific arrangement of the actuator 61, the solenoid valve 64, and the pipes 65, 66, and 67 forming the switching drive unit 60 will be described. Turning to FIG. 3 again, the actuator 61 is fastened to the vehicle body via the bracket 62. That is, the negative-pressure actuator module 60A is fastened to the vehicle body. The solenoid valve 64 is fastened to the vehicle body via a bracket. The pipe 65 coupling the actuator 61 to the solenoid valve 64 is not mounted to the vehicle body or the engine unit 20 and thus is in non-contact with any components. The pipe 66 extending from the solenoid valve 64 to the check valve 67 is fastened to the vehicle body. The pipe 68 extending from the check valve 67 to the air-intake system of the engine unit 20 is mounted at an intermediate position to the vehicle body. One end portion of the pipe 68 is in contact with the engine unit 20. In brief, the components and members except for the pipe 68 are in non-contact with the engine unit 20.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A switching device of a driving power transmission system equipped in an off-road vehicle, comprising:

a switching lever configured to switch driving power transmission of the driving power transmission system for switching between a two-wheel-drive position and a four-wheel-drive position;

a spring that is mounted to the switching lever and is configured to apply a force to cause the switching lever to be biased toward one of the two-wheel-drive switch position and four-wheel-drive switch position; and a negative-pressure actuator module that is coupled to an air-intake system of an engine unit mounted in the off-road vehicle, and further coupled to the switching lever through a cable and is configured to pull the cable to move the switching lever to the other of the two-wheel-drive switch position and four-wheel-drive switch position against the bias of the spring by a negative pressure generated in the air-intake system, the engine unit center-mounted in a longitudinal direction of the vehicle, below vehicle seats.

2. The switching device according to claim 1, wherein the negative-pressure actuator module is positioned laterally adjacent to the engine unit, and disposed in non-contact with the engine unit.

3. The switching device according to claim 1, further comprising:

an electromagnetic valve via which the negative-pressure actuator module is coupled to the air-intake system of the engine unit, the electromagnetic valve being configured to be turned on and off so as to or not to permit the negative pressure to be applied to the negative-pressure actuator module.

4. The switching device according to claim 1, wherein the one switch position is the two-wheel-drive position.

* * * * *